(12) United States Patent
Ahn et al.

(10) Patent No.: US 11,277,868 B2
(45) Date of Patent: Mar. 15, 2022

(54) METHOD AND DEVICE FOR PERFORMING RANDOM ACCESS PROCEDURE

(71) Applicant: LG ELECTRONICS INC., Seoul (KR)

(72) Inventors: Joonkui Ahn, Seoul (KR); Seonwook Kim, Seoul (KR); Changhwan Park, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 16/566,758

(22) Filed: Sep. 10, 2019

(65) Prior Publication Data

US 2020/0154482 A1 May 14, 2020

(30) Foreign Application Priority Data

Jul. 13, 2018 (KR) .......................... 10-2018-0081620

(51) Int. Cl.
*H04W 74/08* (2009.01)
*H04W 16/14* (2009.01)
*H04W 74/00* (2009.01)

(52) U.S. Cl.
CPC ....... *H04W 74/0833* (2013.01); *H04W 16/14* (2013.01); *H04W 74/006* (2013.01)

(58) Field of Classification Search
None
See application file for complete search history.

(56) References Cited

U.S. PATENT DOCUMENTS

| 10,687,339 | B2* | 6/2020 | Babaei | H04L 5/001 |
| 10,757,710 | B2* | 8/2020 | Zhou | H04W 74/085 |
| 2014/0314000 | A1* | 10/2014 | Liu | H04W 72/042 370/329 |
| 2014/0341163 | A1* | 11/2014 | Zhang | H04B 7/024 370/329 |
| 2014/0376483 | A1* | 12/2014 | Hong | H04W 72/048 370/329 |
| 2015/0071198 | A1* | 3/2015 | Deng | H04W 74/006 370/329 |
| 2016/0234861 | A1* | 8/2016 | Ye | H04W 74/0808 |
| 2016/0309516 | A1* | 10/2016 | Wong | H04W 74/0833 |
| 2016/0338109 | A1* | 11/2016 | Rahman | H04W 56/005 |
| 2017/0041956 | A1* | 2/2017 | Abraham | H04W 16/14 |
| 2017/0273056 | A1* | 9/2017 | Papasakellariou | H04W 72/042 |
| 2017/0332410 | A1* | 11/2017 | Babaei | H04W 74/0833 |
| 2019/0053288 | A1* | 2/2019 | Zhou | H04W 74/006 |
| 2019/0097874 | A1* | 3/2019 | Zhou | H04L 5/0023 |
| 2019/0116010 | A1* | 4/2019 | Li | H04L 5/0048 |
| 2019/0116614 | A1* | 4/2019 | Li | H04W 72/0446 |
| 2019/0141695 | A1* | 5/2019 | Babaei | H04L 5/0048 |
| 2019/0141742 | A1* | 5/2019 | Zhou | H04W 24/08 |
| 2019/0159249 | A1* | 5/2019 | Ahn | H04W 56/0045 |

(Continued)

*Primary Examiner* — Ayaz R Sheikh
*Assistant Examiner* — Faiyazkhan Ghafoerkhan
(74) *Attorney, Agent, or Firm* — Lee Hong Degerman Kang Waimey (57) ABSTRACT

A method for performing a random access procedure and a device using the method are provided. The device receives indication information from a base station. The indication information instructs one of a plurality of transmission resource candidates. The device transmits a random access preamble by using the instructed transmission resource candidate.

10 Claims, 9 Drawing Sheets

```
Configure a plurality of
transmission resource candidates          ─ S610

Transmit information instructing one of the
plurality of transmission resource candidates  ─ S620
```

(56) References Cited

U.S. PATENT DOCUMENTS

| | | | |
|---|---|---|---|
| 2019/0254074 A1* | 8/2019 | Jeon | H04W 74/004 |
| 2019/0281635 A1* | 9/2019 | Kwak | H04L 5/0053 |
| 2019/0357092 A1* | 11/2019 | Jung | H04W 36/0055 |
| 2019/0373645 A1* | 12/2019 | Babaei | H04W 72/042 |
| 2019/0387553 A1* | 12/2019 | Gong | H04W 74/006 |
| 2020/0008233 A1* | 1/2020 | Xiong | H04W 76/27 |
| 2020/0154482 A1* | 5/2020 | Ahn | H04W 16/14 |
| 2020/0266952 A1* | 8/2020 | Chatterjee | H04L 5/0048 |
| 2020/0305144 A1* | 9/2020 | Babaei | H04W 72/042 |
| 2020/0383103 A1* | 12/2020 | Zhou | H04L 5/001 |
| 2021/0105820 A1* | 4/2021 | Kim | H04W 74/0891 |

\* cited by examiner

METHOD AND DEVICE FOR PERFORMING RANDOM ACCESS PROCEDURE

CROSS-REFERENCE TO RELATED APPLICATIONS

Pursuant to 35 U.S.C. § 119 (e), this application claims the benefit of earlier filing date and right of priority to Korean Patent Application No. 10-2018-0081620, filed on Jul. 13, 2018, the contents of which are hereby incorporated by reference herein in its entirety.

BACKGROUND

Field

The present disclosure relates to wireless communication, and more particularly, to a method of performing a random access procedure in a wireless communication system, and a device using the method.

Related Art

In 3rd generation partnership project (3GPP), there was an agreement on an overall schedule and concept for 5G standardization in a workshop held in September 2015. An enhanced mobile broadband (eMBB), massive machine type communication (MTC), ultra-reliable and low latency communication (URLLC), or the like was specified as a top-level use-case. In order to satisfy a service scenario and a new requirement, in the 3GPP, it was determined to define a new radio (NR) different from the existing long term evolution (LTE), and both the LTE and the NR were defined as a 5G radio access technique.

An unlicensed band is a band in which various communication protocols co-exist. Since various interference factors have to be considered, communication is possible after a clear channel assessment (CCA) is received to confirm a channel state.

A random access procedure is a procedure in which a wireless device performs uplink transmission without additional scheduling from a base station. The random access procedure in the unlicensed band may be excessively delayed due to the execution of the CCA.

SUMMARY

The present disclosure provides a method for performing a random access procedure and a device using the method.

In an aspect, a method for performing a random access procedure by a wireless device is provided. The method includes receiving configuration information from a base station, the configuration information relating to a plurality of transmission resource candidates, receiving indication information from the base station, the indication information instructing one of the plurality of transmission resource candidates, and transmitting a random access preamble by using the instructed transmission resource candidate.

The indication information may be included in downlink control information (DCI) on a physical downlink control channel (PDCCH).

In another aspect, a device for performing a random access procedure includes a transceiver configured to transmit and receive a radio signal, and a processor operatively coupled to the transceiver. The processor is configured to control the transceiver to receive configuration information from a base station, the configuration information relating to a plurality of transmission resource candidates, control the transceiver to receive indication information from the base station, the indication information instructing one of the plurality of transmission resource candidates, and control the transceiver to transmit a random access preamble by using the instructed transmission resource candidate.

Transmission delay of the random access preamble can be prevented.

DESCRIPTION OF EXEMPLARY EMBODIMENTS

Technical features described below may be used in a communication standard by the 3rd generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system includes LTE-advanced (LTE-A), LTE-A Pro, and/or a 5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a gNB, a base transceiver system (BTS), an access point, etc.

A transmission reception point (TRP) includes an antenna array having one or more antenna elements. The BS may include one or more TRPs.

A new radio (NR) which is a 5G radio access technique supports various bandwidths and frequency bands for more flexible scheduling. Not only a frequency band below 6 GHz but also a frequency band above 6 GHz is supported. A supported bandwidth is up to 100 MHz in the band below 6 GHz and is up to 400 MHz in the band above 6 GHz. In addition, unlike the 3GPP LTE in which a subcarrier spacing is fixed to 15 kHz, the NR may support a variety of subcarrier spacing of 15 kHz, 30 kHz, 60 kHz, 120 KHz, and 240 kHz.

The NR standard supports various numerologies. A structure of a radio frame varies depending on the numerology. Table 1 shows an example of the numerology to be supported.

TABLE 1

| Numerology Index (µ) | Subcarrier spacing (kHz) | Cyclic prefix | Number of OFDM symbols per slot | Number of slots per radio frame | Number of slots per subframe |
|---|---|---|---|---|---|
| 0 | 15 | Normal | 14 | 10 | 1 |
| 1 | 30 | Normal | 14 | 20 | 2 |
| 2 | 60 | Normal | 14 | 40 | 4 |
| 2 | 60 | Extended | 12 | 40 | 4 |
| 3 | 120 | Normal | 14 | 80 | 8 |
| 4 | 250 | Normal | 14 | 160 | 16 |

Figure 1:
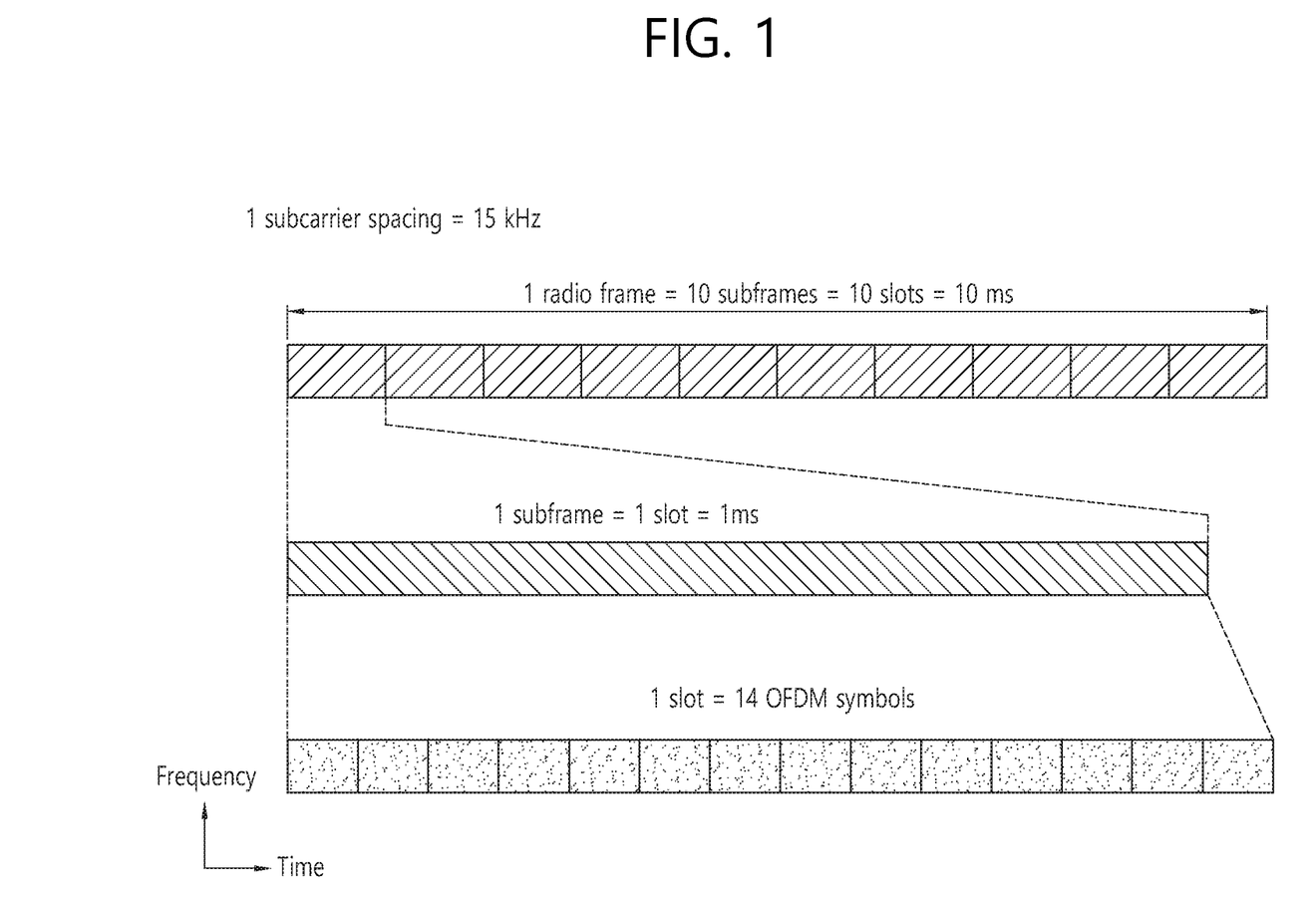
FIG. 1 shows an example of a radio frame structure to which the present disclosure is applied.

FIG. 1 shows an example of a radio frame structure to which the present disclosure is applied. Table 1 shows an example of a numerology index u=0.

A slot may include a plurality of orthogonal frequency division multiplexing (OFDM) symbols. The number of OFDM symbols in a slot of Table 1 is for exemplary purposes only. The OFDM symbol is only for expressing one symbol period in a time region, and is not limited to a multiple-access scheme or a terminology. For example, the OFDM symbol may be referred to as another terminology such as a single carrier-frequency division multiple access (SC-FDMA) symbol, a symbol period, or the like.

The OFDM symbol in the slot may be divided for downlink (DL), flexible, and uplink (UL). This division may be called as a slot format. Information on the slot format may be reported to a wireless device by a BS. The wireless device may receive information on the slot format through a higher layer signal and/or downlink control information (DCI) on a physical downlink control channel (PDCCH). The wireless device assumes that DL transmission occurs in a DL OFDM symbol or a flexible OFDM symbol. The wireless device may perform UL transmission in a UL OFDM symbol or a flexible OFDM symbol.

A resource block (RB) may include a plurality of subcarriers contiguous in a frequency region. For example, the RB may include 12 subcarriers. A common RB (CRB) is an RB in which an index is determined according to a numerology. A physical RB (PRB) is an RB defined in a bandwidth part (BWP). Assume that there are 20 RBs in the overall bandwidth of a specific numerology. The CRB is indexed from 0 to 19. When the BWP includes four CRBs (from a CRB 4 to a CRB 7) among the 20 RBs, the PRB in the BWP is indexed from 0 to 3.

The BWP may be defined according to a size and a start point from the CRB 0 on a given carrier. A specific number (e.g., up to 4) of BWPs may be configured to the wireless device. Only a specific number (e.g., 1) of BWPs may be activated for each cell at a specific time point. The number of configurable BWPs or the number of BWPs to be activated may be configured commonly for UL and DL or may be configured individually. The wireless device may expect DL transmission only in an activated DL BWP. The wireless device may perform UL transmission only in an activated UL BWP.

The wireless device may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 2:
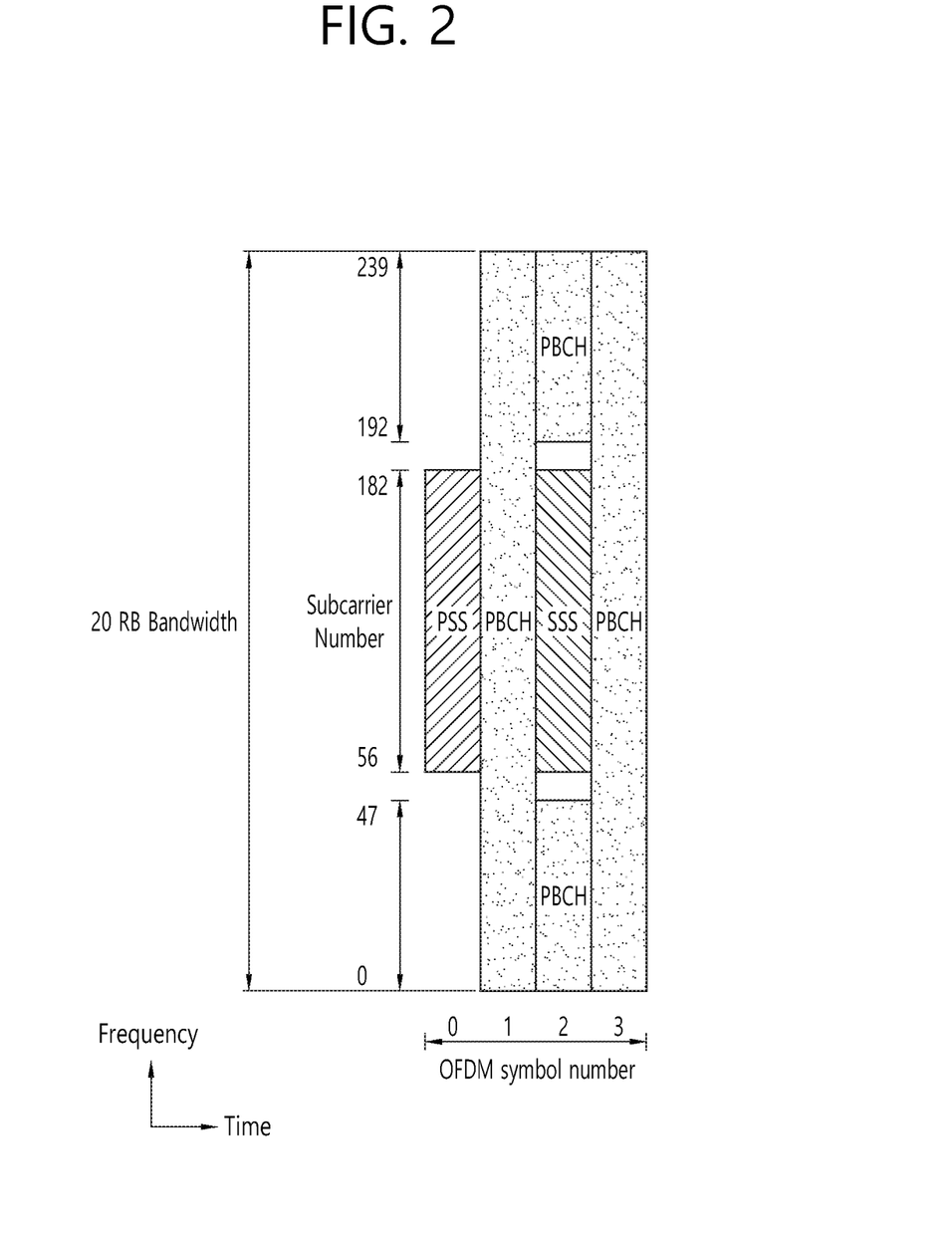
FIG. 2 shows an example of a synchronization channel applied to an embodiment of the present disclosure.

FIG. 2 shows an example of a synchronization channel applied to an embodiment of the present disclosure. Each of a PSS and an SSS may be transmitted through 127 subcarriers in one OFDM symbol. A PBCH may be transmitted through 240 subcarriers in 3 OFDM symbols.

A synchronization signal/PBCH (SSB) block includes a time/frequency region in which the PSS, the SSS, and the PBCH are transmitted. The PSS is used to obtain a symbol timing of the SSB block, and indicates three hypotheses for identifying a cell ID. The SSS is used to identify the cell ID, and indicates 336 hypotheses. As a result, 1008 physical cell IDs may be indicated through the PSS and the SSS.

The SSB block may be transmitted repeatedly according to a predetermined pattern in an SSB window. The SSB window may have a length of 5 ms. For example, when L SSB blocks are transmitted during one SSB window, all of the L SSB blocks include the same information, but may be transmitted through beams of different directions. That is, a quasi co-location (QCL) may not be applied for the SSB blocks in one SSB window. A beam used to receive the SSB block may be used in a subsequent operation (e.g., a random access operation or the like) between a wireless device and a network. The SSB window may be repeated with a specific period (e.g., 20 ms). The repetition period may be determined individually according to a numerology.

The PBCH has a bandwidth of 20 RBs in 2nd and 4th OFDM symbols, and has a bandwidth of 8 RBs in a 3rd ODM symbol. A demodulation reference signal (DMRS) for decoding the PBCH is included in the PBCH. A frequency region is determined in the DMRS according to a cell ID value. The DMRS for the PBCH may include information indicating an index of an SSB block.

The PBCH may carry a master information block (MIB). System information (SI) is divided into minimum SI (MSI) and other SI (OSI). The MSI may be divided again into MIB and system information type1 (SIB1), and the remaining MSI except for the MIB may be called remaining minimum SI (RMSI).

The MIB includes information required to decode the SIB1. For example, the MIB may include at least any one of the SIB1, a message used in the random access procedure, a subcarrier spacing applied to other system information, a frequency offset between RBs transmitted after an SSB block, a bandwidth of PDCCH/SIB, and information for decoding the PDCCH. The MIB may be transmitted periodically, and the same information may be transmitted repeatedly for a specific time period. The SIB1 includes control information, transmitted repeatedly through the PDSCH, for initial access of the UE and information for decoding a different SIB.

A DL channel includes a physical downlink control channel (PDCCH), a physical downlink shared channel (PDSCH), and a physical broadcast channel (PBCH). The UL channel includes a physical uplink control channel (PUCCH), a physical uplink shared channel (PUSCH), and a physical random access channel (PRACH).

The PDSCH carries DL data. The PBCH carries a master information block (MIB) required for initial access. The PUSCH carries UL data.

The PDCCH carries DCI. The DCI includes a UL grant having resource allocation for scheduling PUSCH transmission and a DL grant having resource allocation for scheduling PDSCH transmission. A control resource set (CORESET) is defined as a resource for monitoring the PDCCH. In order to allow the wireless device to identify an owner or content of the DCI in the PDCCH, a unique identifier is masked to cyclic redundancy check (CRC) of the DCI. This identifier is called a radio network temporary identifier (RNTI). When the DCI includes a UL grant or DL grant for a specific wireless device, a cell RNTI (C-RNTI) is used. When the DCI carries system information, a system information RNTI (SI-RNTI) is used.

The PUCCH carries uplink control information (UCI). The UCI may include hybrid automatic repeat request (HARQ) ACK/NACK and/or channel state information (CSI). The PUCCH may be transmitted in one or more OFDM symbols according to a PUCCH format.

In the following embodiment, an operation may be performed in a licensed band or an unlicensed band. The licensed band is a band in which an exclusive use is ensured to a specific communication protocol or a specific service provider. The unlicensed band is a band in which various communication protocols co-exist and a shared use is ensured. For example, the unlicensed band may include 2.4 GHz and/or 5 GHz bands used by a wireless local area network (WLAN). In the unlicensed band, it is assumed that a channel is secured through contention between communication nodes. Accordingly, communication in the unlicensed band is required to perform channel sensing so as confirm that another communication node does not transmit a signal. For convenience, this is called listen before talk (LBT) or clear channel assessment (CCA). A case where it is determined that another communication node does not transmit a signal in a specific channel is called that 'a channel is idle', 'CCA is confirmed', or 'LBT is confirmed'. When it is said that 'LBT is performed' or 'CCA is performed' or 'carrier sense (CS) is performed', it means that whether a wireless medium is idle or whether a channel of another node is used is confirmed and thereafter an access to the channel is achieved. A cell operating in an unlicensed band is called an unlicensed cell or a licensed-assisted access (LAA) cell. A cell operating in a licensed band is called a licensed cell.

Each serving cell may correspond to a BWP or a carrier. The serving cell may be divided into a primary cell and a secondary cell. The primary cell is a cell in which a wireless device performs initial connection establishment or connection re-establishment. The secondary cell is activated or deactivated by an instruction of the primary cell. When a plurality of serving cells are configured to the wireless device, the primary cell may be a licensed cell, and the secondary cell may be an unlicensed cell. Alternatively, the primary cell may be an unlicensed cell, and the secondary cell may be a licensed cell. A plurality of licensed cells or a plurality of unlicensed cells may be configured.

Beamforming utilizing a plurality of antennas is used in an NR system. A transmitter transmits a beam which covers a relatively narrow region. However, beam sweeping for transmitting a beam in several directions may be performed to cover the entire coverage of a cell.

A random access procedure is a procedure in which a wireless device performs UL transmission without additional UL scheduling from a BS. The random access procedure is used for various purposes such as initial access, connection reestablishment, handover, time alignment establishment, system information request, beam failure recovery, etc.

Figure 3:
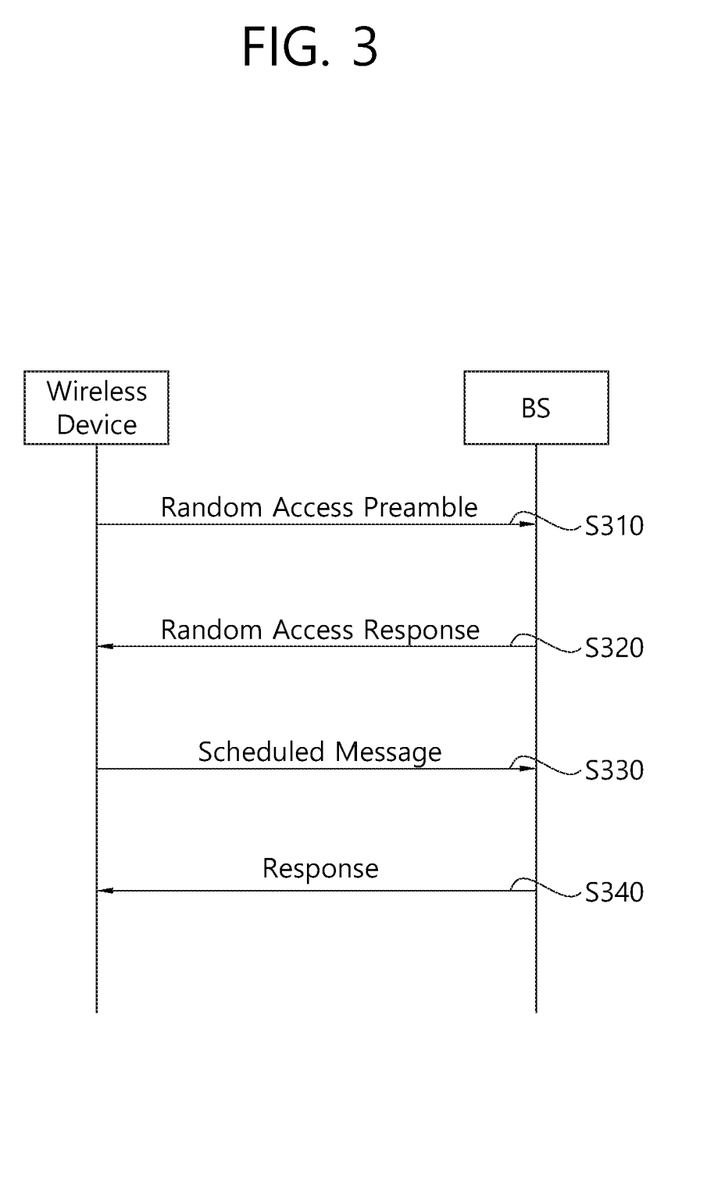
FIG. 3 shows a random access procedure according to the conventional technique.

FIG. 3 shows a random access procedure according to the conventional technique.

In step S310, a wireless device transmits a random access preamble to a BS. The random access preamble may be randomly selected by the wireless device from among a plurality of preamble sequences.

In step S320, the wireless device receives a random access response on a PDSCH. The PDSCH is scheduled by a PDCCH (called RA_PDCCH) masked by random access (RA)-RNTI. The wireless device first receives DCI having DL resource allocation for the PDSCH on the RA-PDCCH, and then receives the random access response on the basis of the DL resource allocation. The random access response includes temporary C-RNTI and UL resource allocation for a scheduled message.

In step S330, the wireless device transmits to the BS the scheduled message on the basis of a UL resource allocation in the random access response. The scheduled message includes a device identifier in the wireless device. The device identifier includes an identifier such as an international mobile subscriber identity (IMSI), a temporary international mobile subscriber identity (TIMSI), etc., used by the BS to actually identify the wireless device.

In step S340, the wireless device receives a response of the scheduled message from the BS. The response includes the device identifier and information required for connection. Accordingly, the random access procedure is complete.

According to the conventional random access procedure, the procedure is complete after the message is exchanged four times between the BS and the wireless device. However, in the unlicensed band, it may take long time to complete the random access procedure since a channel state must be confirmed before the message is transmitted.

Figure 4:
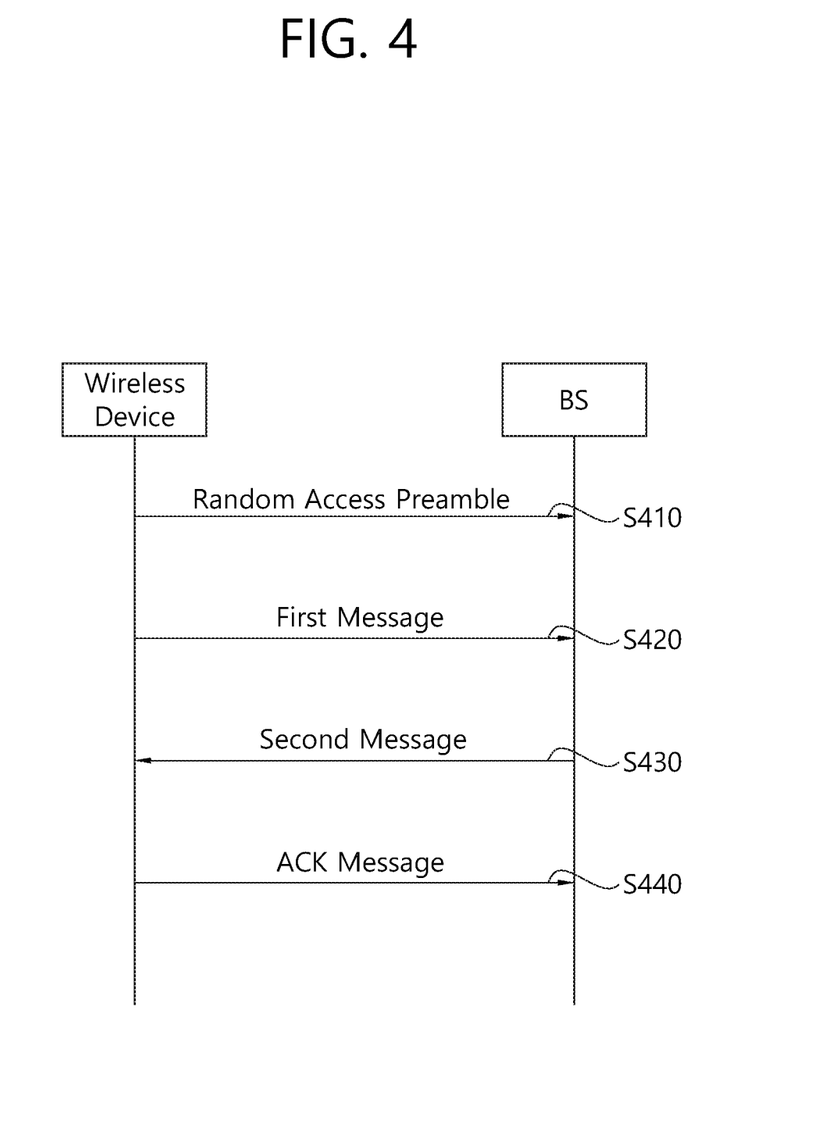
FIG. 4 shows a two-step random access procedure.

FIG. 4 shows a two-step random access procedure.

In step S410, a wireless device transmits a random access preamble to a BS. The BS may operate an unlicensed cell. The random access preamble may be transmitted in the unlicensed cell. The unlicensed cell may be a primary cell or a secondary cell. Before the random access preamble is transmitted, the wireless device may perform CCA to confirm whether a wireless medium (e.g., a frequency region in which the random access preamble is transmitted) is idle. Upon confirming that the wireless medium is idle, the wireless device may transmit the random access preamble. If the wireless medium is not idle, the wireless device may perform again the CCA after a backoff time elapses.

The wireless device may transmit a sequence selected from among a plurality of preamble sequences as a random access preamble. The plurality of preamble sequences may be generated based on a Zadoff-Chu sequence.

$$x_{u,v}(n) = x_u((n + Cv) \bmod N), \; x_{u(i)} = e^{-j\frac{\pi u i(i+1)}{N}} \quad \text{[Equation 1]}$$

Herein, N is a sequence length, Cv is a cyclic shift value, and u is a root index i=0, 1, . . . , N. N may vary depending on a random access preamble format.

A resource configuration for the random access preamble may be given in advance by the BS. The resource configuration may include a value used to determine the value u, an RA time resource and RA frequency resource for transmitting the random access preamble, and information on a subcarrier spacing for transmitting the random access preamble. The RA time resource may indicate at least one slot in which the random access preamble can be transmitted among a plurality of slots and an OFDM symbol index at which transmission starts within the slot. The RA frequency resource may indicate at least one RB for transmitting the random access preamble within a BWP.

In step S420, the wireless device transmits a first message to the BS. The first message may be transmitted simultaneously with the random access preamble or after the random access preamble is transmitted. 'Simultaneous transmission' may imply that the random access preamble and the first message are transmitted in the same slot, or transmission starts on the same OFDM symbol in a slot. When it is said that 'the first message is transmitted after the random access preamble is transmitted', it may imply that the first message is transmitted in a slot after the slot in which the random access preamble is transmitted, or an OFDM symbol on which transmission of the first message starts appears after an OFDM symbol on which transmission of the random access preamble starts in the slot.

The first message may include a device identifier used to identify the wireless device. The device identifier may include IMSI or TIMSI, but is not limited thereto. The first message may further include information indicating a purpose of the random access procedure.

The first message may be transmitted on a PUSCH. A PUSCH resource used in transmission of the PUSCH for the first message may be classified into a PUSCH frequency resource, a PUSCH time resource, and a PUSCH sequence resource. The PUSCH frequency resource may indicate at least one RB in which the PUSCH is transmitted within the BWP. The PUSCH time resource may indicate a slot in which the PUSCH is transmitted and/or an OFDM symbol index at which transmission starts in the slot. The PUSCH sequence resource may indicate a scrambling sequence used in scrambling of the PUSCH and/or a sequence used in generation of a reference signal (RS) of the PUSCH.

In an embodiment, the PUSCH resource used in transmission of the PUSCH for the first message may be associated with a transmission resource of the random access preamble. More specifically, any one of the PUSCH time/frequency/sequence resources used in transmission of the PUSCH for the first message may be determined based on at least any one of a sequence of the random access preamble, an RA time resource, and an RA frequency resource.

For example, when the random access preamble is transmitted in a slot k, the first message may be transmitted in a slot k+m. The value of m may be pre-designated, or may be determined according to the value of k. For another example, the first message may be transmitted in the same RB as the RB in which the random access preamble is transmitted. The RB in which the first message is transmitted may be determined based on the RB in which the random access preamble is transmitted.

The first message may include information on a transmission resource of the random access preamble. This is because the BS may not be able to estimate a relationship between the random access preamble and the first message, based only on an association of the transmission resource of the random access preamble and the PUSCH transmission resource. The information may be directly included in the first message, or may be multiplexed with uplink control information (UCI) to the first message, or may be masked to CRC of the first message.

In step S430, the wireless device receives a second message from the BS. If the first message is successfully decoded, the BS may transmit the second message in response to the first message.

The second message may include a device identifier in the first message or an auxiliary identifier obtained from the device identifier. The auxiliary identifier may have a smaller number of bits than the device identifier.

The second message may be transmitted on a PDSCH. The wireless device may first receive a PDCCH having scheduling information of the PDSCH (this is called 'A-PDCCH'), and may receive the second message on the PDSCH on the basis of the scheduling information. The wireless device monitors the A-PDCCH in a search space having a plurality of PDCCH candidates. An identifier masked to CRC of the A-PDCCH is called A-RNTI. An identifier used to generate a scrambling sequence used in a scramble of the A-PDCCH is called an S-ID.

In an embodiment, the second message may be transmitted as an additional message to each wireless device.

A transmission resource of A-PDCCH may be associated with at least any one of a transmission resource of the random access preamble, a device identifier, and an auxiliary identifier. For example, at least any one of a search space, A-RNTI, and S-ID for monitoring the A-PDCCH may be associated with at least any one of a sequence of the random access preamble, an RA time resource, an RA frequency resource, a device identifier, and an auxiliary identifier.

The transmission resource of the A-PDCCH may be associated with a PUSCH resource used in transmission of the PUSCH for the first message. For example, at least any one of the search space, A-RNTI, and S-ID for monitoring the A-PDCCH may be associated with at least any one of the PUSCH time/frequency/sequence resources, device identifier, and auxiliary identifier used in transmission of the PUSCH for the first message.

In another embodiment, the second message may be transmitted as a common message for all wireless devices in a cell or a group of the wireless devices in the cell. A plurality of wireless devices for performing the random access preamble may receive one common second message, and may extract information for the wireless devices from the second message. The transmission resource of the A-PDCCH may be associated with a common identifier for all wireless devices in a cell or a group of the wireless devices in the cell. For example, at least any one of the search space, A-RNTI, and S-ID for monitoring the A-PDCCH may be associated with the common identifier.

In step S440, the wireless device may transmit to the BS an ACK message based on a decoding result of the second message. When the random access procedure is complete by receiving the second message, this step may be omitted. The ACK message may include HARQ ACK/NACK. The HARQ ACK/NACK may be transmitted on a PUCCH.

The second message may include information on a transmission resource of the PUCCH for the HARQ ACK/NACK. The transmission resource of the PUCCH for the HARQ ACK/NACK may be obtained based on a transmission resource of an A_PDCCH for the second message. The transmission resource of the PUCCH for the HARQ ACK/NACK may be defined as at least one of a device identifier, an auxiliary identifier, a random access preamble sequence, an RA frequency resource, an RA time resource, and a PUSCH time/frequency/sequence resource used in transmission of the PUSCH for the first message.

When the second message is received from the BS, the random access procedure cannot be complete. Therefore, the random access procedure can be prevented from being delayed since no additional CCA needs to be performed.

Figure 5:
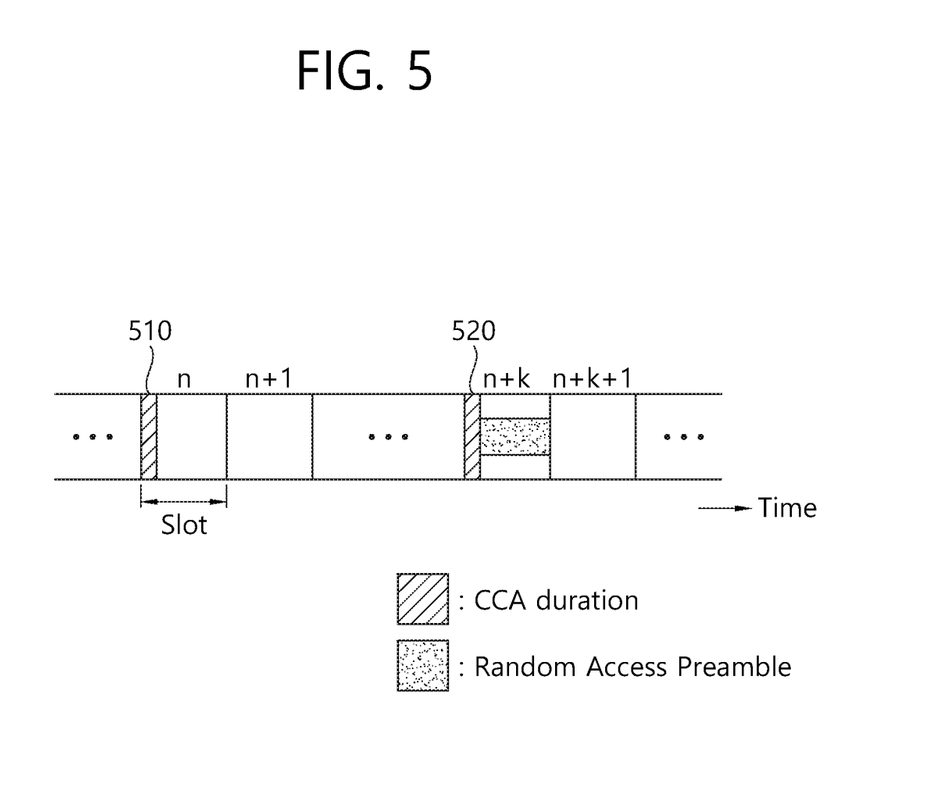
FIG. 5 shows an example of transmission of a random access preamble.

FIG. 5 shows an example of transmission of a random access preamble. The transmission of the random access preamble may be applied to transmission of the random access preamble shown in the embodiment of FIG. 4.

Assume that the random access preamble can be transmitted in a slot n. The wireless device performs CCA for a CCA duration 510 of an unlicensed band. The CCA duration may include one or more OFDM symbols as a duration in which the CCA is performed. Alternatively, the CCA duration may include part of one OFDM symbol. If the current measurement value is less than the CCA threshold, the wireless device may determine that a wireless medium is idle and the CCS succeeds. Otherwise, the wireless device may determine that the wireless medium is not idle and the CCA fails.

If the CCA fails in the slot n, the wireless device defers the transmission of the random access preamble for next time. The CCA is performed for a CCA duration 520 in a next possible slot n+k. If the CCA succeeds, the wireless device transmits the random access preamble.

If the same CCA threshold is maintained when the CCA is performed again after the CCA failure, the transmission of the random access preamble may be excessively delayed.

In an embodiment, when a next CCA is retried after the CCA failure, a next CCA threshold may be greater than a previous CCA threshold. When the next CCA is retried after the CCA failure, the next CCA duration may be shorter than the previous CCA duration. A CCA success rate may be increased to prevent the delay of the transmission of the random access preamble.

In another embodiment, when the next CCA is retried after the CCA failure, the next CCA threshold may be less than the previous CCA threshold. When the next CCA is retried after the CCA failure, the next CCA duration may be longer than the previous CCA duration. This is to prevent a collision of preamble transmission by decreasing the CCA success rate, when a plurality of wireless devices simultaneously attempt the random access procedure in a continuous manner.

When it is said that the CCA duration is increased or decreased, it may imply that the CCA duration is increased or decreased. For example, a length of the CCA duration may be increased from 5 microsecond (us) to 9 us. Alternatively, when the CCA duration includes a plurality of continuous CCA slots, the CCA duration may be increased or decreased by increasing or decreasing the number of CCA slots included for each CCA duration.

The conventional random access procedure declares a failure in the random access procedure if the number of times of failing in the random access preamble transmission exceeds a maximum value. The failure in the transmission of the random access preamble implies that the wireless device transmits the random access preamble but fails in receiving a random access response thereon or a second message. In an unlicensed band, the wireless device continuously fails in the CCA, which may result in a continuous failure in transmission of the random access preamble. Accordingly, the CCA failure may be necessarily associated with the failure in the random access procedure.

Xmax denotes the maximum number of times of failing in transmission of a random access preamble, and X denotes a count value depending on a failure in the transmission of the random access preamble. Ymax denotes a maximum CCA failure count, and Y denotes a CCA failure count. Xmax and Ymax may be predefined, or may be given by the BS.

In an embodiment, if a sum of X and Y exceeds Zmax, the wireless device may declare a random access failure. Zmax may be predetermined, or may be given by the BS.

In another embodiment, if X exceeds Xmax, or Y exceeds Ymax, the wireless device may declare the random access failure. Y may be reset whenever the wireless device transmits the random access preamble once. Alternatively, Y may be reset after the random access procedure fails or succeeds.

In another embodiment, if X exceeds Xmax, or Y exceeds Ymax, or a sum of X and Y exceeds Zmax, the wireless device may declare the random access failure. Y may be reset whenever the wireless device transmits the random access preamble once. Alternatively, Y may be reset after the random access procedure fails or succeeds.

In another embodiment, if X exceeds Xmax, the wireless device may declare the random access failure. Qmax is defined as the maximum number of times for attempting CCA per preamble. Qmax may be predefined, or may be given by the BS. If Y exceeds Qmax, the wireless device may reset Y, and may increase X by 1.

If the wireless device fails in transmission of the random access preamble in a time/frequency resource or fails in CCA, it may be estimated that many devices have attempted preamble transmission or traffic is congested in the time/frequency resource. In order to increase a success rate of the random access procedure, the BS may adaptively increase or decrease a transmission resource of the random access preamble. The BS may use DCI or PDSCH to configure an additional resource for transmission of the random access preamble. The additional resource may be used in retransmission of the random access preamble of which transmission has failed, or may be used when the random access preamble is not transmitted due to a CCA failure. The additional resource may be preconfigured, and DCI may be used to activate or deactivate the additional resource.

If a specific wireless device occupies a channel for relatively long time in an unlicensed band, giving a penalty to CCA may be a way of ensuring fairness to transmission between different devices. The random access preamble may vary in length in a time region according to a target coverage or channel state. The longer the length of the random access preamble, the smaller the CCA threshold may be applied. Alternatively, the longer the random access preamble, the longer the CCA duration may be applied.

The random access procedure may be divided into a contention based random access procedure using a randomly selected random access preamble and a contention free random access procedure using a pre-designated random access preamble. Since the contention free random access procedure may be planned to avoid collision of the BS with respect to another device, it may be advantageous to more increase a CCA success rate. The contention free random access procedure may have a greater CCA threshold than the contention based random access procedure. Alternatively, the contention free random access procedure may have a much shorter CCA duration than the contention based random access procedure.

The random access procedure is used for various purposes such as initial access, connection reestablishment, handover, time alignment establishment, system information request, beam failure recovery, etc. The beam failure recovery requires more rapid processing, as a procedure of requesting for confirming/switching a beam by determining that there is a problem in a beam used by the wireless device to communication with the BS. The random access procedure for the beam failure recovery may have a greater CCA threshold than a random access procedure of another purpose. Alternatively, the random access procedure for the beam failure recovery may have a shorter CCA duration than the random access procedure of another purpose.

When the conventional random access procedure of FIG. 3 and the proposed random access procedure of FIG. 4 are both used, since the proposed random access procedure intends a more rapid random access, it may be more advantageous to increase a CCA success rate. The proposed random access procedure may have a greater CCA threshold than the conventional random access procedure. Alternatively, the proposed random access procedure may have a shorter CCA duration than the conventional random access procedure.

The contention free random access procedure may decrease the CCA success rate so that the BS surely avoids collision with another device in comparison with the contention based random access procedure. The contention free random access procedure may have a smaller CCA threshold than the contention based random access procedure. Alternatively, the contention free random access procedure may have a longer CCA duration than the contention based random access procedure.

When the random access procedure of FIG. 3 and the proposed random access procedure of FIG. 4 are both used, the CCA success rate may be decreased so that the proposed random access procedure ends earlier than the conventional random access procedure with collision with another device. The proposed random access procedure may have a shorter CCA threshold than the conventional random access procedure. Alternatively, the proposed random access procedure may have a longer CCA duration than the conventional random access procedure.

The following embodiment may be applied to the random access procedure of FIG. 3 or the random access procedure of FIG. 4. The following embodiment may be applied to an operation in an unlicensed band or a licensed band.

Figure 6:
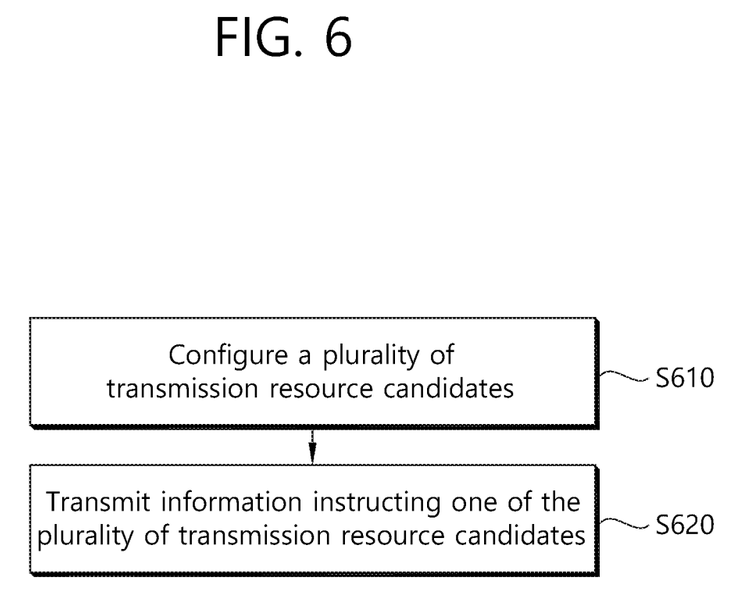
FIG. 6 shows a method of dynamically allocating a transmission resource of a random access preamble according to an embodiment of the present disclosure.

FIG. 6 shows a method of dynamically allocating a transmission resource of a random access preamble according to an embodiment of the present disclosure.

When a BS allows a wireless device to transmit a random access preamble in a channel occupation time (COT) obtained through a CCA operation in an unlicensed band, the wireless device may transmit the random access preamble with only a simple CCA operation or without the CCA operation. Since the COT is dynamically determined according to a CCA result of the BS, for such an operation, it is required to dynamically allocate a transmission resource of the random access preamble. The transmission resource may include at least any one of a preamble length, a cyclic prefix (CP) length, a transmission start point in a slot, a preamble sequence, and a time/frequency resource.

In step S610, the BS configures a plurality of transmission resource candidates to the wireless device. The BS may transmit configuration information including the plurality of transmission resource candidates to the wireless device. The configuration information may be transmitted through a radio resource control (RRC) message or broadcast message for the wireless device.

In step S620, the BS transmits indication information indicating one of the plurality of transmission resource candidates to the wireless device. The wireless device may transmit the random access preamble by using the indicated transmission resource. The wireless device which has received the indication information may transmit the random access preamble without performing the CCA operation or by performing the CCA operation for a short time period.

The indication information may be included in DCI on a PDCCH. The DCI may further include request information requesting for transmission of the random access preamble. A common RNTI may be masked to CRC of the PDCCH which carries the DCI having the indication information.

A time resource capable of transmitting the random access preamble may be limited to a pre-configured time duration, and the indication information may inform only whether the time resource can be used.

The configuration information may include one or more transmission resource candidates. The indication information may indicate activation or deactivation of the configured one or more transmission resource candidates. The wireless device may select one of activated transmission resource candidates, and may transmit the random access preamble by using the selected transmission resource.

In another embodiment, the BS may provide the wireless device with the transmission resource of the random access preamble through a paging message. The BS may instruct the wireless device in an idle mode to attempt a UL access through the paging message. The paging message may be used to indicate dynamic allocation of the transmission resource of the random access preamble or transmission of the random access preamble. The paging message transmitted on the PDSCH may include the indication information or the transmission resource of the random access preamble. DCI which schedules the paging message may include the indication information or the transmission resource of the random access preamble.

The BS may dynamically indicate a beam applied to the transmission of the random access preamble. In an NR standard, the transmission resource of the random access preamble is statically associated with a specific DL reference signal in advance. This association is called DL-UL coherence or QCL. The wireless device may transmit the random access preamble through a transmission beam suitable for a reception beam of the specific DL reference signal. As shown in the aforementioned embodiment of FIG. 6, when the BS dynamically allocates the transmission resource of the random access preamble, it may be difficult to pre-define an association relation between the specific DL reference signal and the transmission of the random access preamble. Therefore, when the BS dynamically indicates the transmission resource of the random access preamble, a beam (and/or an associated DL reference signal) to be applied to the transmission of the random access preamble may be dynamically indicated. The indication may be transmitted through DCI or a paging message. Alternatively, when the DCI or the paging message is transmitted in association with the specific DL reference signal, the wireless device may transmit the random access preamble associated with the specific DL reference signal.

The BS may pre-configure the association relation between the DL reference signal and the transmission resource of the random access preamble, and thereafter may dynamically indicate whether the transmission resource can be used through the DCI or the paging message. The BS provides the wireless device with information on the DL reference signal associated each of a plurality of transmission resource candidates. The BS may directly indicate the DL reference signal, or the DCI or the paging message may be transmitted in association with the DL reference signal. The wireless device may transmit the random access preamble by using the transmission resource associated with the DL reference signal among the plurality of transmission resource candidates.

Figure 7:
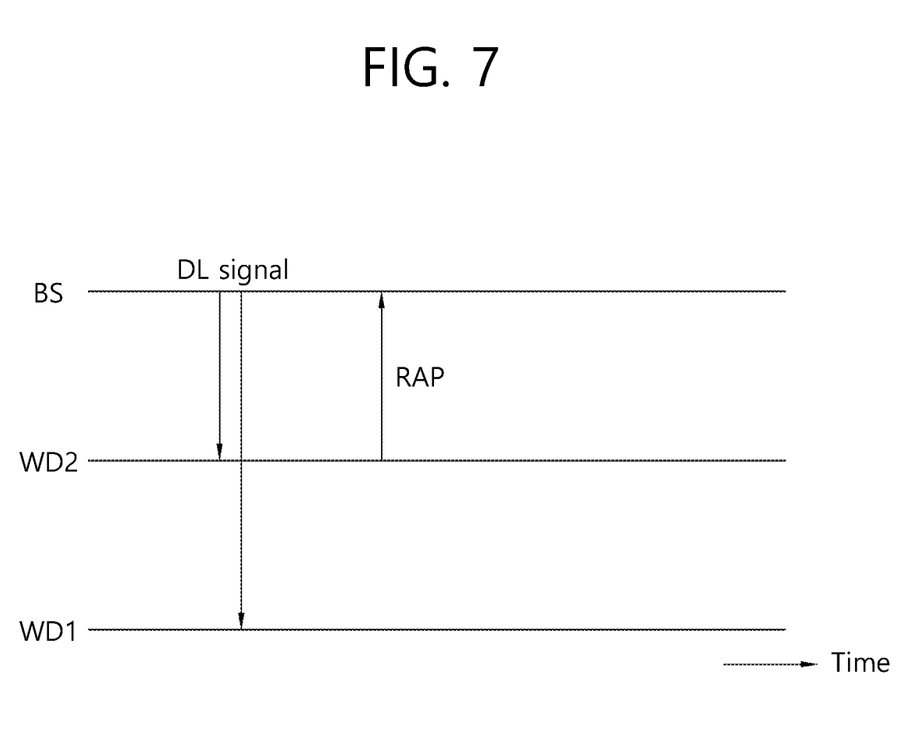
FIG. 7 shows an example of random access preamble transmission.

FIG. 7 shows an example of random access preamble transmission.

In an unlicensed band, wireless devices WD1 and WD2 are present at different locations with respect to a BS. The wireless devices WD1 and WD2 may transmit a random access preamble (RAP) on the basis of a specific boundary of a DL signal received from the BS. Since each wireless device experiences a different transmission delay for the BS, RAP transmission may be initiated at a different time point. In this case, a time point at which the wireless device WD1 starts RAP transmission may always be later than that of the wireless device WD2. The RAP transmitted by the wireless device WD2 is detected in a CCA operation performed by the wireless device WD1, and thus RAP transmission of the wireless device WD1 may be performed with a lower priority in comparison with the wireless device WD2. Accordingly, a method in which each wireless device randomizes a RAP transmission start time point is proposed. The randomizing method may be applied within a time duration designated in a cell or a time duration dynamically allocated commonly to a plurality of wireless devices.

In an embodiment, the wireless device may randomly determine an RAP transmission start time point in a unit time resource for RAP transmission.

When N RAP transmission start time points $t\_1, t\_2, \ldots, t\_N$ (N>1) are defined, the wireless device may randomly select one RAP transmission start time point, and may transmit RAP at the selected time point. The selecting of the RAP transmission start time point may be defined as a pattern which varies over time on the basis of at least one of a slot/subframe index, a radio frame index, a wireless device identifier, and a cell identifier. In this scheme, a time duration in which the RAP transmission start time point can be applied may be determined as T, and the wireless device may determine the RAP transmission start time within T in a uniformly random manner.

In another embodiment, the wireless device may randomly determine a length of the CCA time duration or a CCA start time point to be applied to RAP transmission. The wireless device may start RAP transmission after a successful CCA or after a determined time. The wireless device may randomly determine a length of a CCA time duration in which the CCA is to be checked or a start time point of the CCA time duration.

When K CCA start time points $t\_1, t\_2, \ldots, t\_K$ (K>1) are defined, the wireless device may randomly select one CCA start time point, and may initiate the CCA at the selected time point. The selecting of the CCA start time point may be defined as a pattern which varies over time on the basis of at least one of a slot/subframe index, a radio frame index, a wireless device identifier, and a cell identifier. In this scheme, a time duration in which the CCA start time point can be applied may be determined as S, and the wireless device may determine the CCA start time point within S in a uniformly random manner.

When M CCA time duration lengths $t\_1, t\_2, \ldots, t\_M$ (M>1) are defined, the wireless device may randomly select one CCA time duration length, and may perform the CCA for the selected duration. The selecting of the CCA time duration length may be defined as a pattern which varies over time on the basis of at least one of a slot/subframe index, a radio frame index, a wireless device identifier, and a cell identifier. In this scheme, a time duration in which the CCA time duration length can be applied may be determined as U, and the wireless device may determine the CCA start time point within U in a uniformly random manner.

In another embodiment, the wireless device may initiate RAP transmission after a specific time offset from a CCA completion time for RAP transmission in a unit time resource for RAP transmission. The time offset may be predefined or may be designated by the BS. The time offset may be defined as a sufficiently long time such that a CCA duration is deviated between wireless devices within a distance which may cause interference to CCA.

In the random access procedure of FIG. 3 and the random access procedure of FIG. 4, a random access response and a third message may be both regarded as a response of RAP. Assume that the response of RAP is a random access response (RAR). Assume that a scheduled message or third message transmitted by the wireless device after the RAR is a message-C. The message-C may include a response acknowledgement for the RAR, information for contention resolution, a DL CQI/RSRP measurement value, or the like.

Whether the CCA operation is applied to transmission of the message-C may vary according to whether a transmission time point of the message-C is included in COT occupied by the BS through the CCA operation. Therefore, the RAR may include information on whether to apply CCA before transmitting the message-C. The RAR may include information on a CCA parameter required for the CCA operation. The CCA parameter may include at least one of a contention window size, a maximum contention window size, and a CCA type.

Figure 8:
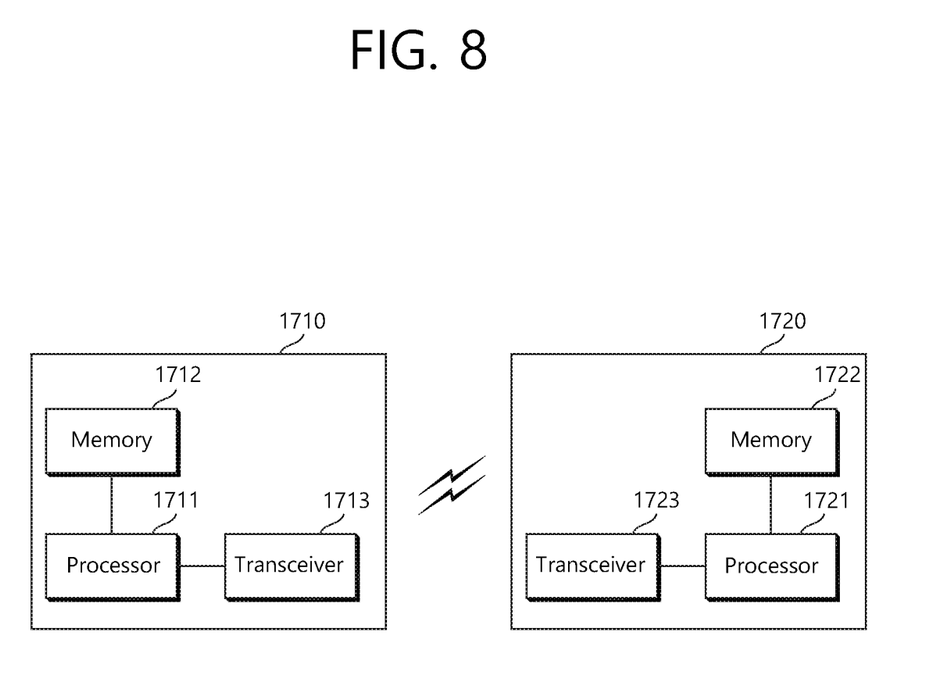
FIG. 8 is a block diagram showing a wireless communication system for implementing an embodiment of the present disclosure.

FIG. 8 is a block diagram showing a wireless communication system for implementing an embodiment of the present disclosure.

A wireless device 1710 includes a processor 1711, a memory 1712, and a transceiver 1713. The memory 1712 is operatively coupled to the processor 1711, and stores various instructions executed by the processor 1711. The transceiver 1713 is operatively coupled to the processor 1711, and transmits and/or receives a radio signal. The processor 1711 implements the proposed functions, procedures, and/or methods. In the aforementioned embodiment, an operation of the wireless device may be implemented by the processor 1711. When the aforementioned embodiment is implemented with a software instruction, the instruction may be stored in the memory 1712, and may be executed by the processor 1711 to perform the aforementioned operation.

A BS 1720 includes a processor 1721, a memory 1722, and a transceiver 1723. The memory 1722 is operatively coupled to the processor 1721, and stores various instructions executed by the processor 1721. The transceiver 1723 is operatively coupled to the processor 1721, and transmits and/or receives a radio signal. The processor 1721 implements the proposed functions, procedures, and/or methods. In the aforementioned embodiment, an operation of the BS may be implemented by the processor 1721. When the aforementioned embodiment is implemented with a software instruction, the instruction may be stored in the memory 1722, and may be executed by the processor 1721 to perform the aforementioned operation.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the embodiment is implemented in software, the aforementioned scheme may be implemented using a module (procedure, function, etc.)

which performs the aforementioned function. The module may be stored in the memory and executed by the processor. The memory may be disposed to the processor internally or externally and connected to the processor using a variety of well-known means.

Figure 9:
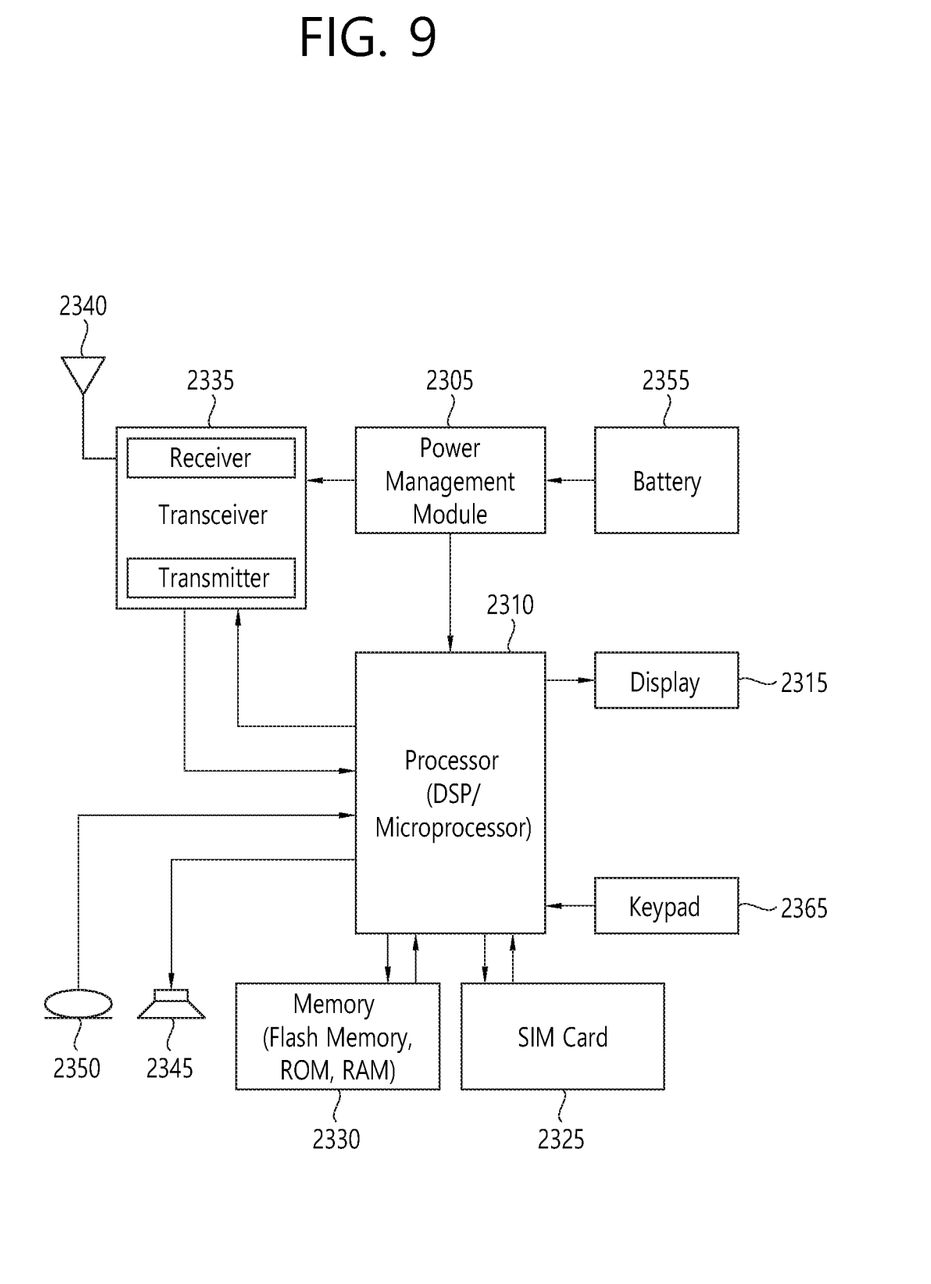
FIG. 9 is a more detailed block diagram of a wireless device for implementing an embodiment of the present disclosure.

FIG. 9 is a more detailed block diagram of a wireless device for implementing an embodiment of the present disclosure.

A wireless device includes a processor 2310, a power management module 2305, a battery 2355, a display 2315, a keypad 2320, a subscriber identification module (SIM) card 2325, a memory 2330, a transceiver 2335, one or more antennas 2340, a speaker 2345, and a microphone 2350.

The processor 2310 may be configured to implement proposed functions, procedures, and/or methods described in this disclosure. Layers of the radio interface protocol may be implemented in the processor 2310. The processor 2310 may include Application-specific Integrated Circuits (ASICs), other chipsets, logic circuits, and/or data processors. The processor may be an application processor (AP). The processor 2310 may include at least one of a digital signal processor (DSP), a central processing unit (CPU), a graphics processing unit (GPU), and a modulator and demodulator (modem). An example of the processor 2310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 2305 manages power for the processor 2310 and/or the transceiver 2335. The battery 2355 supplies power to the power management module 2305. The display 2315 outputs results processed by the processor 2310. The keypad 2320 receives inputs to be used by the processor 2310. The keypad 2320 may be displayed on the display 2315. The SIM card 2325 is an integrated circuit which is used to securely store an international mobile subscriber identity (IMSI) and its related key, which are used to identify and authenticate subscribers on mobile telephony devices such as mobile phones and computers. It is also possible to store contact information in many SIM cards.

The memory 2330 is operatively coupled to the processor 2310, and stores a variety of information for operating the processor 2310. The memory 2330 may include a read-only memory (ROM), a random access memory (RAM), a flash memory, a memory card, a storage medium, and/or other equivalent storage devices. When the embodiment is implemented in software, the techniques explained in the present disclosure may be implemented with a module (i.e., procedure, function, etc.) for performing the functions explained in the present disclosure. The module may be stored in the memory 2330 and may be performed by the processor 2310. The memory 2330 may be implemented inside the processor 2310. Alternatively, the memory 2330 may be implemented outside the processor 2310, and may be coupled to the processor 2310 in a communicable manner by using various well-known means.

The transceiver 2335 is operatively coupled to the processor 2310, and transmits and/or receives a radio signal. The transceiver 2335 includes a transmitter and a receiver. The transceiver 2335 may include a baseband circuit for processing a radio frequency signal. The transceiver 2335 controls one or more antennas 2340 to transmit and/or receive a radio signal.

The present disclosure may be applied to various future technologies as follows.

<Artificial Intelligence (AI)>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

What is claimed is:

1. A method for performing a random access procedure by a wireless device, the method comprising:
   receiving configuration information from a base station, the configuration information relating to a plurality of transmission resource candidates;
   receiving indication information from the base station, the indication information instructing one of the plurality of transmission resource candidates;
   transmitting a random access preamble by using the instructed transmission resource candidate,
   wherein the random access preamble is transmitted in an unlicensed band; and
   receiving a random access response for the random access preamble from the base station,
   wherein the random access response includes information on a clear channel assessment (CCA) parameter for transmission of a subsequent message.

2. The method of claim 1, wherein the indication information is included in downlink control information (DCI) on a physical downlink control channel (PDCCH).

3. The method of claim 1, wherein the random access preamble is transmitted in the unlicensed band without performing a CCA.

4. The method of claim 1, further comprising:
   transmitting a first message to the base station on a physical uplink shared channel (PUSCH), wherein the first message includes a device identifier identifying the wireless device.

5. The method of claim 4, wherein the first message is transmitted simultaneously with the random access preamble, or is transmitted without waiting for the random access response.

6. A device for performing a random access procedure, the device comprising:
   a transceiver configured to transmit and receive a radio signal; and
   a processor operatively coupled to the transceiver and configured to:
   control the transceiver to receive configuration information from a base station, the configuration information relating to a plurality of transmission resource candidates;
   control the transceiver to receive indication information from the base station, the indication information instructing one of the plurality of transmission resource candidates;
   control the transceiver to transmit a random access preamble by using the instructed transmission resource candidate,
   wherein the random access preamble is transmitted in an unlicensed band; and
   control the transceiver to receive a random access response for the random access preamble from the base station,
   wherein the random access response includes information on a clear channel assessment (CCA) parameter for transmission of a subsequent message.

7. The device of claim 6, wherein the indication information is included in downlink control information (DCI) on a physical downlink control channel (PDCCH).

8. The device of claim 6, wherein the random access preamble is transmitted in the unlicensed band without performing a CCA.

9. The device of claim 6, wherein the processor is configured to control the transceiver to transmit a first message to the base station on a physical uplink shared channel (PUSCH) via the transceiver, wherein the first message includes a device identifier identifying the device.

10. The device of claim 9, wherein the first message is transmitted simultaneously with the random access preamble, or is transmitted without waiting for the random access response.

* * * * *